US007144002B2

(12) United States Patent
Zhao et al.

(10) Patent No.: US 7,144,002 B2

(45) Date of Patent: Dec. 5, 2006

(54) ELECTRIC LOCKING DEVICE

(75) Inventors: Kai Zhao, Troy, MI (US); Erick Rudaitis, Sterling Heights, MI (US); David Ken Uchida, Birmingham, MI (US); Jeffrey Gerald Kozlowski, Clinton Township, MI (US)

(73) Assignee: SMC Corporation, Tokyo (JP)

(*) Notice: Subject to any disclaimer, the term of this patent is extended or adjusted under 35 U.S.C. 154(b) by 191 days.

(21) Appl. No.: 10/862,422

(22) Filed: Jun. 8, 2004

(65) Prior Publication Data

US 2005/0269755 A1 Dec. 8, 2005

(51) Int. Cl.
*B23Q 3/08* (2006.01)

(52) U.S. Cl. .......................................... 269/32

(58) Field of Classification Search .................... 269/2, 269/32, 91–94, 228, 233, 232, 224, 237, 269/234, 225, 226, 49

See application file for complete search history.

(56) References Cited

U.S. PATENT DOCUMENTS 6,439,560 B1 * 8/2002 Sawada et al. ............... 269/32
6,698,736 B1 * 3/2004 Dugas et al. ................. 269/32
6,902,160 B1 * 6/2005 Zajac et al. ................... 269/49

* cited by examiner

*Primary Examiner*—Robert C. Watson
(74) *Attorney, Agent, or Firm*—Oblon, Spivak, McClelland, Maier & Neustadt, P.C.

(57) ABSTRACT

The present invention provides an electric locking device which has a simple structure, with which an operating time can be saved, and which has a sufficient clamping force required for operation. To a camshaft coupled to an electric motor through a speed reducing mechanism, a first cam and a second cam conjugate with each other are coupled. The first cam drives an arm driving rod in a clamping direction and the second cam drives the arm driving rod in a returning direction. Rotational motions of the first and second cams are converted into linear motions in the same direction by first and second cam contacting members supported by the arm driving rod. The arm driving rod drives a clamping arm to cause the arm to carry out a clamping operation. A cam face is provided as to move the clamping arm at a high speed until the arm reaches a vicinity of an end and to move the arm at a lower speed after the arm has reached the vicinity of the end.

10 Claims, 8 Drawing Sheets

ELECTRIC LOCKING DEVICE

TECHNICAL FIELD OF THE INVENTION

The present invention relates to a small electric locking device with a short stroke which is used for a clamp such as a pin clamp, a pin locator, a pin ejector, a pallet holder, and a gripper.

DESCRIPTION OF THE PRIOR ART

There are pin clamping devices as disclosed in Japanese Utility Model Application Laid-open No. 7-42676 and the like. Although this type of pin clamping device has a short stroke, a pin clamp head is required to approach a workpiece or the like as quickly as possible to shorten the time required for clamping and is required to then slow down at the time of clamping to generate the necessary clamping force.

In forming a pin clamping device to meet such requirements by using an electric motor, means for converting a driving force of the electric motor into a linear motion by a gear mechanism and a feed screw mechanism and the like and then transmitting the linear motion transmitted by the feed screw mechanism to a clamping arm through a toggle linkage is difficult to adapt to a small pin clamping device with a short stroke.

As a result of study of various driving means suitable for the pin clamping device, the present inventors have reached a conclusion that it is effective, for the above-described pin clamping device, to provide a clamp stroke and a return stroke respectively to a clamping arm with first and second cams rotating in synchronization with each other and have accomplished the present invention by making further improvements by using the conclusion as a basis.

SUMMARY OF THE INVENTION

Therefore, it is an object of the present invention to provide an electric locking device having a simple structure and conducting an operation suitable for a pin clamp by using the first and second cams.

It is another object of the invention to provide an electric locking device in which the speed of operation of a clamping arm up to the time immediately before clamping is increased to save operating time and a clamping force sufficient for clamping operation can be exerted.

It is another object of the invention to provide an electric locking device which can reliably clamp workpieces of various sizes and a clamping force of which is stable.

To achieve the above objects, according to the present invention, there is provided an electric locking device comprising: a body forming an outer shell of the device; a camshaft coupled to an electric motor through a speed reducing mechanism in the body; first and second cams fixed to the camshaft and conjugate with each other; first and second cam contacting members respectively in contact with cam faces of the first and second cams to convert rotational motions of the first and second cams into linear motions in the same direction; an arm driving rod including a supporting rod for supporting the first and second cam contacting members with a constant distance between them in their moving direction and driven in the moving direction by the first and second cam contacting members; and a clamping arm driven by the arm driving rod to carry out a clamping operation.

The first cam includes the cam face required for driving the arm driving rod in a clamping direction through the first cam contacting member. The second cam includes the cam face required for driving the arm driving rod in a returning direction through the second cam contacting member. The cam face of the first cam is such a cam face as to move the arm driving rod at a high speed until the clamping arm reaches a vicinity of an end and to move the rod at a lower speed after the arm has reached the vicinity of the end. The cam faces of the first and second cams are conjugate with each other so that the first and second cam contacting members are always and substantially in contact with the cam faces.

In a preferred embodiment of the present invention, the cam faces of the first and second cams are substantially spiral curved faces and directions of the spirals of both the cam faces are opposite to each other. The speed reducing mechanism for reducing a speed of and driving the camshaft by the electric motor is formed by connecting gear speed reducing mechanisms in which large-diameter spur gears are driven by small-diameter spur gears in multiple stages.

In a preferred embodiment of a driving mechanism of the clamping arm in the present invention, the clamping arm having a hook-shaped clamp head at a tip end of the arm is coupled to a tip end of the arm driving rod for turning, a guide groove is formed in the clamping arm, a guide pin to be fitted in the guide groove is provided to the body, and the clamping arm having the guide groove is disposed so that the arm can move while guided by the guide pin, and the guide groove in the clamping arm is formed in such a shape as to provide a desired clamping operation to the clamp head of the clamping arm.

More specifically, the guide groove in the clamping arm is formed of an inclined groove for moving the clamp head from a retracted position where the clamp head is retracted to a clamping ready position where the head faces a workpiece to be clamped in an initial position for starting the clamping operation and a clamping direction groove contiguous to the inclined groove for guiding the head from the clamp ready position to a clamping position.

In a preferred embodiment of the present invention, the arm driving rod is formed by disposing a clamp spring for applying a clamping force between a driven rod mounted with two cam contacting members and a connecting rod coupled to the clamping arm. In a concrete embodiment, a spring case housing the clamp spring is coupled to the driven rod, an end of the clamp spring on a side of the clamping arm is retained by the spring case, an opposite end of the clamp spring is coupled to the connecting rod, and the clamping arm is rotatably coupled to the connecting rod. In this case, it is preferable that a flange portion to which the spring case is fixed is provided to the driven rod and movements of the flange portion and the spring case are guided by bushings respectively fitted in the body.

In a preferred and concrete structure of the arm driving rod, the connecting rod includes a head portion to which the clamping arm is coupled for turning and a shaft portion having a smaller diameter than the head portion, the spring case includes a partition wall having a through hole through which the shaft portion of the connecting rod passes in a case cylinder housing the clamp spring, the head portion of the connecting rod is housed for sliding on a clamp arm side of the partition wall, and the shaft portion of the connecting rod is inserted through a center of the clamp spring housed in the case cylinder and a spring seat for receiving the end portion of the clamp spring is fixed to a tip end of the connecting rod on an opposite face side of the partition wall.

In a preferred embodiment of the electric locking device, a toggle forming projection at which the arm driving rod slightly overshoots a final clamping position is provided at a portion on the cam face of the first cam immediately before the clamping arm reaches an end of a clamp stroke. Thus, a toggle mechanism can be formed.

According to the electric locking device having the above structure, if the first and second cams are driven through the speed reducing mechanism by driving of the electric motor, the driven rod is driven in the clamping or clamping releasing direction by the first and second cam contacting members. In other words, the first cam drives the driven rod in the clamping direction through the first cam contacting member and the second cam drives the driven rod in the returning direction through the second cam contacting member. Therefore, it is possible to provide the clamp stroke required for operation and the return stroke for returning to an original position to the clamping arm.

Moreover, by properly setting a shape of the cam face, it is possible to move the driven rod at a high speed until the clamping arm reaches the vicinity of the end of the clamp stroke so as to save the operating time and to move the driven rod at a low speed when the clamping arm has reached the vicinity of the end so as to obtain the large clamping force. As a result, with a simple structure using the first and second cams, it is possible to provide operations suitable for pin clamping to the clamping arm and to clamp the workpiece with a large force even by using a small and low-power electric motor.

In the electric locking device, the clamp spring is disposed in the arm driving rod so that size variations and the like of the workpieces to be clamped can be absorbed by the clamp spring. As a result, the workpiece can reliably be clamped with the stable clamping force.

DESCRIPTION OF THE EMBODIMENT

Figure 1:
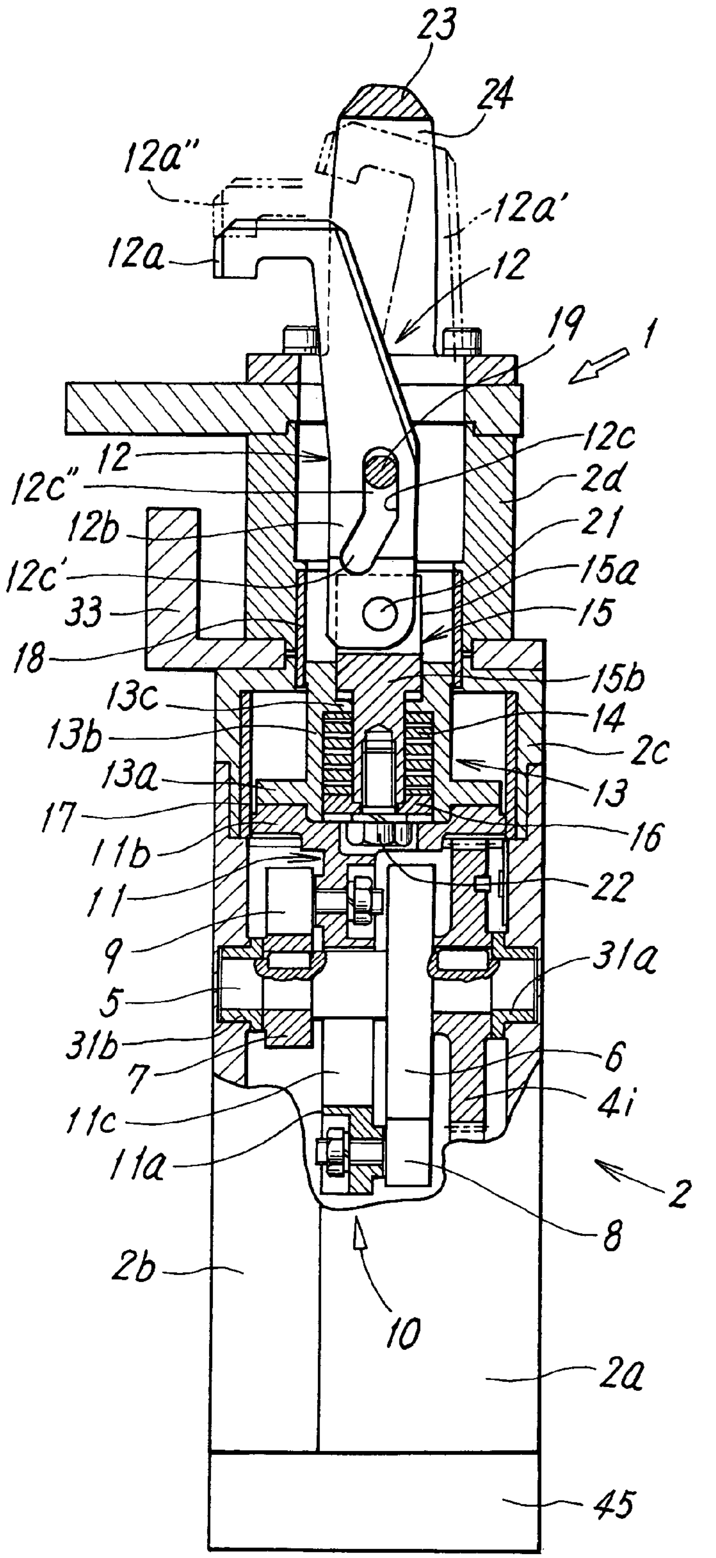
FIG. 1 is a partially-cutaway side view of an embodiment of an electric locking device according to the present invention.

The drawings show a pin clamping device as an embodiment of an electric locking device according to the present invention. As shown in FIGS. 1 to 5, the electric pin clamping device 1 includes a body 2 forming an outer shell of the device, a speed reducing mechanism 4 housed in the body 2 and formed of a plurality of spur gears 4*a* to 4*i* engaged in order as can be seen from FIGS. 3 and 4 to reduce the speed of rotation of an electric motor 3, a camshaft 5 formed of a shaft of a last-stage spur gear 4*i* in the speed reducing mechanism 4, a first cam 6 and a second cam 7 fixed to the camshaft 5 by key coupling and conjugate with each other, a first cam contacting member 8 and a second cam contacting member 9 respectively in contact with cam faces 6*a* and 7*a* of the first and second cams 6 and 7 to convert rotational motions of the first cam 6 and the second cam 7 into linear motions in the same direction, an arm driving rod 10 formed of a driven rod 11 and a connecting rod 15, the driven rod 11 supporting the first and second cam contacting members 8 and 9 with a constant space between them in their moving direction to be driven by the first and second cam contacting members 8 and 9 in the moving direction and the connecting rod 15 coupled to the driven rod 11 through a spring case 13 and a clamp spring 14 in the case, and a clamping arm 12 driven by the arm driving rod 10 to carry out a clamping operation and having a hook-shaped clamp head 12*a* projecting outside from the body 2.

Figure 3:
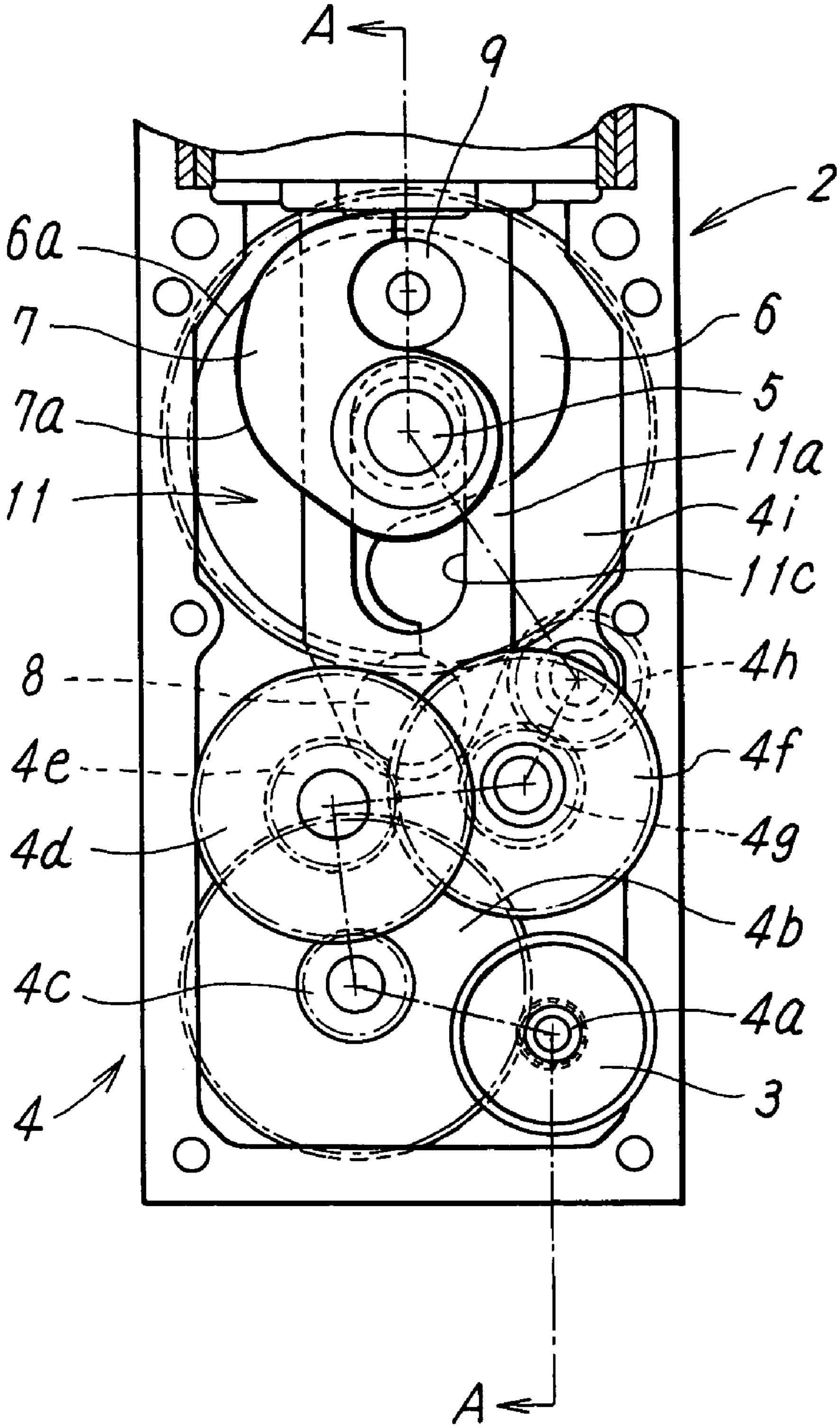
FIG. 3 is a partial front view of a gear train of a speed reducing mechanism used for the device.
Figure 4:
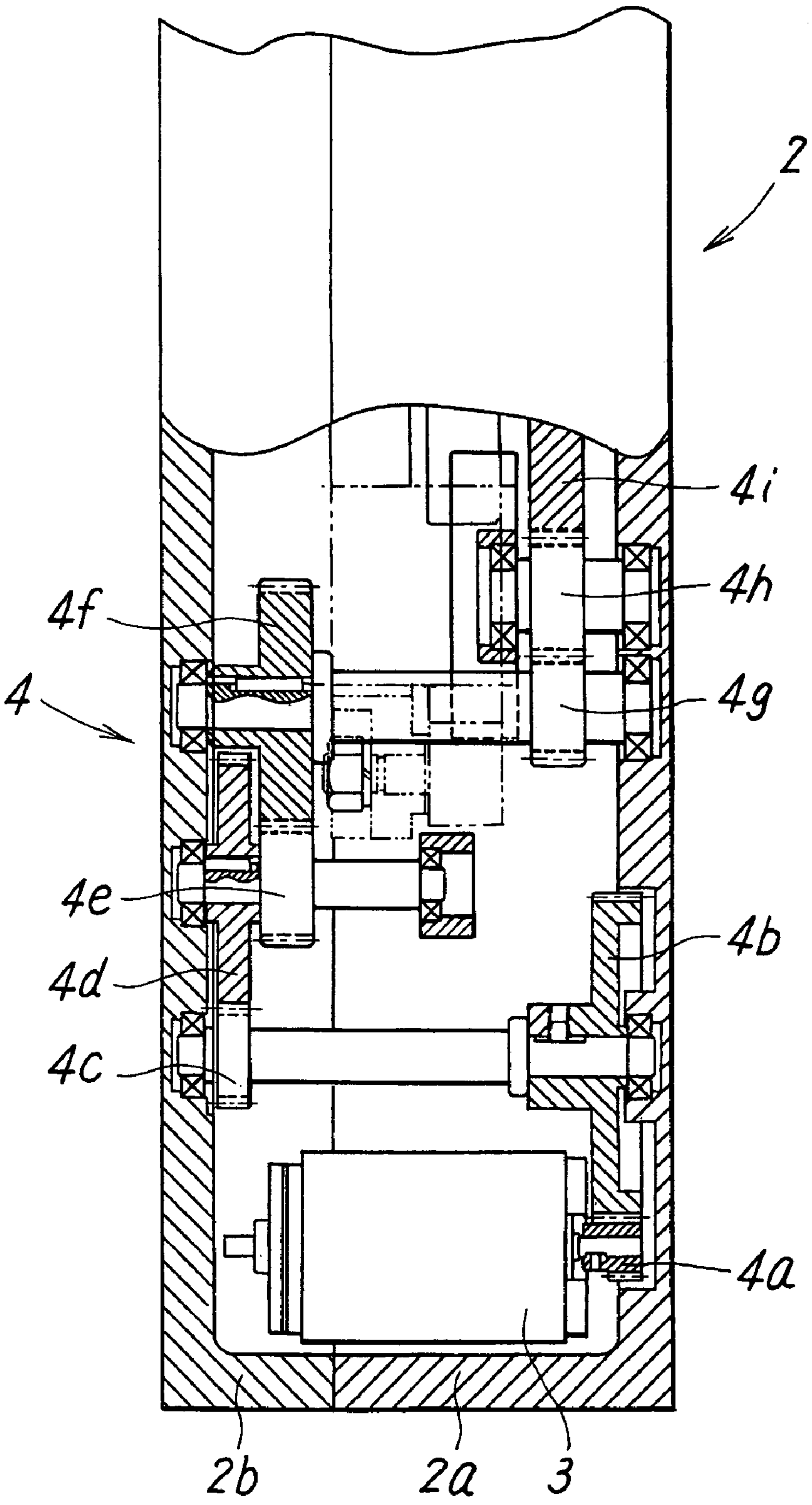
FIG. 4 is a sectional view taken along a line A—A in FIG. 3.

The speed reducing mechanism 4 formed of the spur gears 4*a* to 4*i* reduces the speed of rotation of the spur gear 4*a* fixed to a rotary shaft of the electric motor 3 and transmits it to the camshaft 5 with the spur gears 4*a* to 4*i* engaged in order as shown in FIGS. 3 and 4. To put it concretely, the spur gears 4*b* and 4*c*, the spur gears 4*d* and 4*e*, and the spur gears 4*f* and 4*g* are respectively fixed to common rotary shafts and gear speed reducing mechanisms in which the large-diameter spur gears 4*b*, 4*d*, 4*f*, and 4*i* are driven by the small-diameter spur gears 4*a*, 4*c*, 4*e*, and 4*h* are connected in multiple stages. Through the camshaft 5, a rotating force of the spur gear 4*i* is transmitted to the first cam 6 and the second cam 7 fixed to the camshaft 5. The rotary shafts of these gears are respectively and rotatably supported by the body 2 through bearings.

Figure 5:
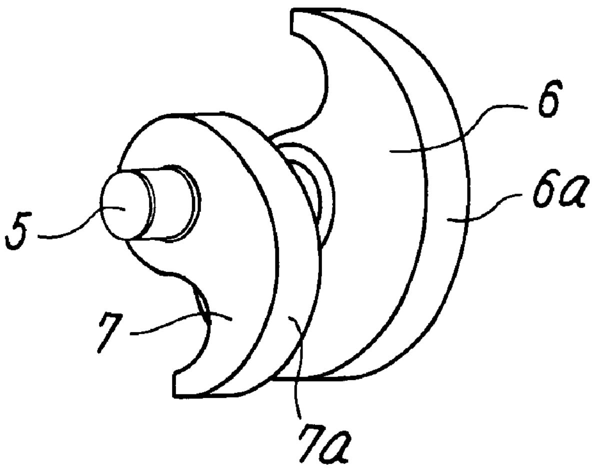
FIG. 5 is a perspective view of structures of first and second cams.

As clearly shown in FIG. 5, the cam faces 6*a* and 7*a* at peripheries of the first and second cams 6 and 7 are curved faces forming substantially spiral shapes and directions of the spirals in both the cam faces 6*a* and 7*a* are opposite to each other. The first cam 6 applies a force in a clamping direction (downward) to the driven rod 11 forming a part of the arm driving rod 10 through the first cam contacting member 8 formed of a roller and the second cam 7 applies a force in a returning direction (upward) to the driven rod 11 through the second cam contacting member 9 as shown in FIGS. 1 and 2.

The arm driving rod 10 is formed of the driven rod 11 mounted with the first and second cam contacting members 8 and 9, the connecting rod 15 connected to the clamping arm 12, and the spring case 13 disposed between them and housing the clamp spring 14 as described above and applies a clamping force to the clamping arm 12 by the clamp spring 14.

Figure 2:
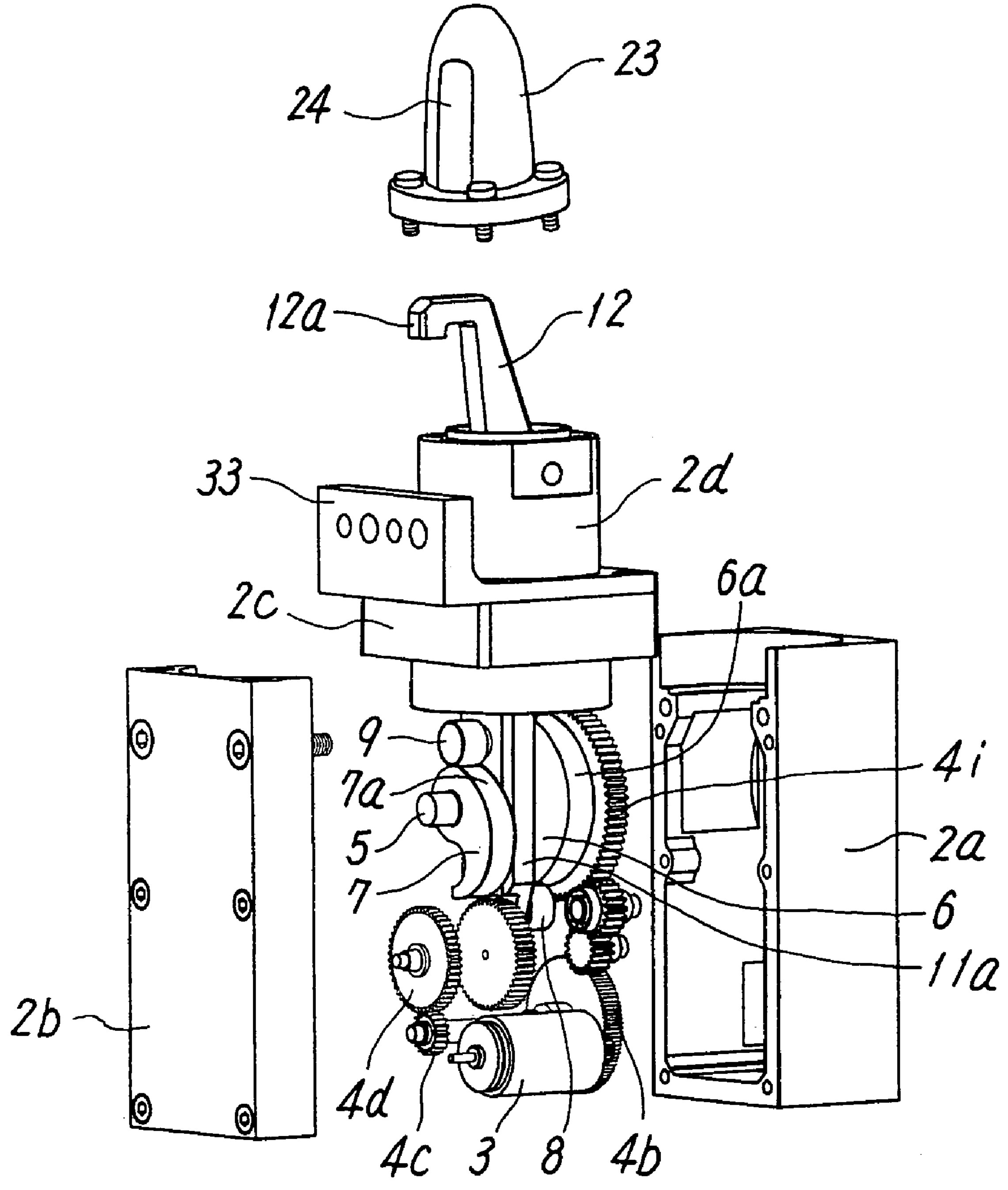
FIG. 2 is a perspective view with a part of the device disassembled.

To put it more concretely, as shown in FIGS. 1 and 3, the driven rod 11 includes a support plate portion 11*a* for mounting the first and second cam contacting members 8 and 9 with a constant space between them in their driven direction so that they are rotatable and a flange portion 11*b* integrally provided to an end portion of the support plate portion 11*a*. An elongated hole 11*c* is formed in the support plate portion 11*a* and the camshaft 5 is inserted through the elongated hole 11*c*. The spring case 13 housing the clamp spring 14 is fixed to the flange portion 11*b*. An outer periphery of the flange portion 11*b* slides while being guided by a bushing 17 fitted in the body 2.

The spring case 13 includes a flange portion 13*a* fixed to the flange portion 11*b* of the driven rod 11, a cylindrical case cylinder 13*b* rising from the flange portion 13*a*, and a partition wall 13*c* for partitioning an inside space of the case cylinder 13*b* into upper and lower parts and a through hole through which a shaft portion 15*b* of the connecting rod 15 is inserted is formed in the partition wall 13*c*. The connecting rod 15 includes a head portion 15*a* to which the clamping arm 12 is coupled for turning by a pin 12 and the shaft portion 15*b* with a smaller diameter than the head portion 15*a*. The head portion 15*a* of the connecting rod 15 is housed for sliding on the clamping arm 12 side of the partition wall 13*c*. On the opposite face side of the partition wall 13*c*, the shaft portion 15*b* of the connecting rod 15 is inserted through a center of the clamp spring 14 housed in the case cylinder 13*b* and a spring seat 16 for receiving an end portion of the clamp spring 14 is fixed to a tip end of the shaft portion 15*b* by a bolt 22. The case cylinder 13*b* of the spring case 13 slides while guided by a bushing 18 fitted in the body 2.

Consequently, the force of the driven rod 11 in the clamping direction (downward in FIG. 1) is transmitted from the partition wall 13*c* of the spring case 13 through the clamp spring 14, the spring seat 16, and the connecting rod 15 to the clamping arm 12 and the force of the driven rod 11 in the returning direction is transmitted from the partition wall 13*c* of the spring case 13 through the head portion 15*a* of the connecting rod 15 to the clamping arm 12.

The clamping arm 12 includes the hook-shaped clamp head 12*a* at its tip end. A base end of the arm 12 is coupled to the connecting rod 15 forming a part of the arm driving rod 10 by a pin 21 so that the base end can turn. A guide groove 12*c* is formed in an arm portion 12*b* linearly extending from the base end. A guide pin 19 provided to the body 2 is fitted in the guide groove 12*c* so that the clamping arm 12 can move while guided by the guide pin 19.

The guide groove 12*c* in the clamping arm 12 is formed in such a shape that the clamp head 12*a* of the clamping arm 12 can carry out a desired clamping operation. To put it concretely, the groove 12*c* is formed of an inclined groove 12*c*' for moving the head 12*a* from a retracted position (12*a*') where the clamp head 12*a* is retracted to a clamping ready position (12*a*") where the head 12*a* faces a workpiece to be clamped in an initial position for starting the clamping operation and a clamping direction groove 12*c*" contiguous to the inclined groove for guiding the head from the clamping ready position to the clamping position (position in solid lines).

Although it is not shown in the drawings, a seat member for supporting the workpiece to be clamped is disposed to face the clamp head in the clamping position.

A location pin 23 having a slit 24 which can house the clamping arm 12 in the retracted position is provided to an upper end portion of the body 2 as shown in FIGS. 1 and 2 and the seat member for clamping the workpiece between the clamp head 12*a* is attached to surround a lower portion of the locate pin 23.

With the above structure, the clamping arm 12 moves to the clamping ready position (12*a*") while the clamping direction groove 12*c*" of the guide groove 12*c* is guided by the guide pin 19 in a first half of a return stroke of the clamping arm 12. In the latter half of the stroke, on the other hand, since the inclined groove 12*c*' of the guide groove 12*c* is guided by the guide pin 19, the clamping arm 12 moves up while inclining clockwise in FIG. 1 and is housed in the slit 24 formed in the locate pin 23.

Therefore, the clamping arm 12 is housed in the locate pin 23 when the workpiece is positioned by fitting of a hole or the like formed in the workpiece in the locate pin 23 and therefore the clamping arm 12 does not hinder the positioning. During the clamp stroke of the workpiece, the clamping arm 12 moves to the clamping position by reversing the above operation.

The above-described first cam 6 and the second cam 7 will be described in further detail. The cam faces 6*a* and 7*a* of the cams on which the first cam contacting member 8 and the second cam contacting member 9 roll are formed of the substantially spiral curved faces. These cam faces 6*a* and 7*a* are designed so that a distance L between axial centers of the first cam contacting member 8 and the second cam contacting member 9 rolling on the curved faces is always constant as will be described below by using FIGS. 6 and 7.

Figure 6:
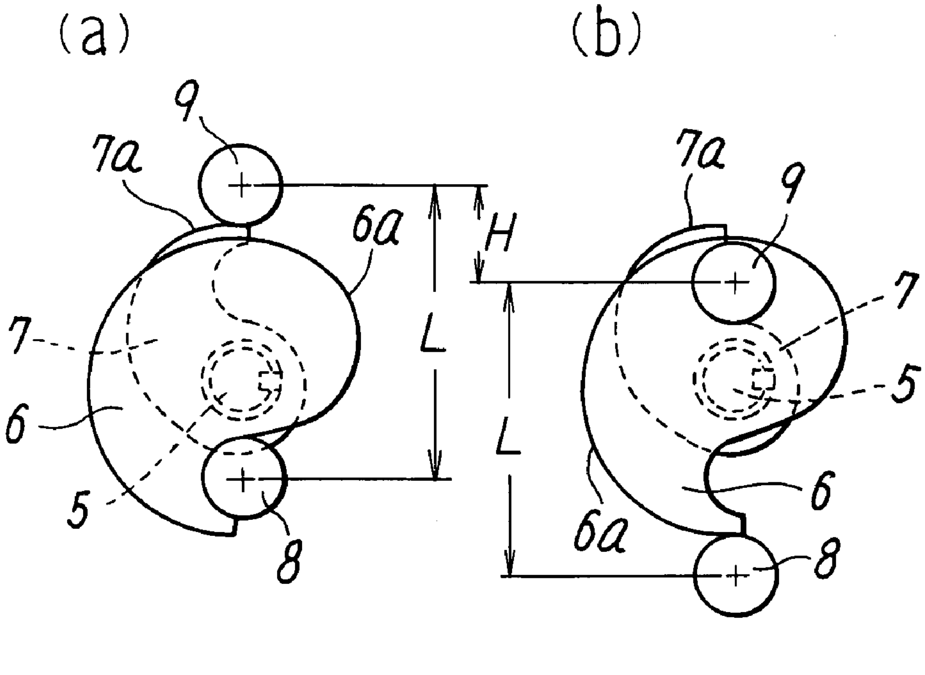
FIG. 6 is an explanatory drawing showing relationships between the first and second cams and first and second cam contacting members.

In FIG. 6(*a*), the first cam contacting member 8 and the second cam contacting member 9 are in return positions (moved-upper positions in FIG. 1). When the clamp stroke starts by the electric motor 3, the first cam 6 and the second cam 7 are turned clockwise by the common camshaft 5. As a result, the first cam contacting member 8 and the second cam contacting member 9 moves down while rolling on the cam faces 6*a* and 7*a* to drive the driven rod 11. When the clamping arm 12 reaches the clamping position, the first cam contacting member 8 and the second cam contacting member 9 are in positions where they have moved down by a stroke H as shown in FIG. 6(*b*).

In the return stroke, the first cam 6 and the second cam 7 rotate counterclockwise from the state in FIG. 6(*b*) and, as a result, the first cam contacting member 8 and the second cam contacting member 9 move up while rolling on the cam faces 6*a* and 7*a* and return to the state in FIG. 6(*a*).

Figure 7:
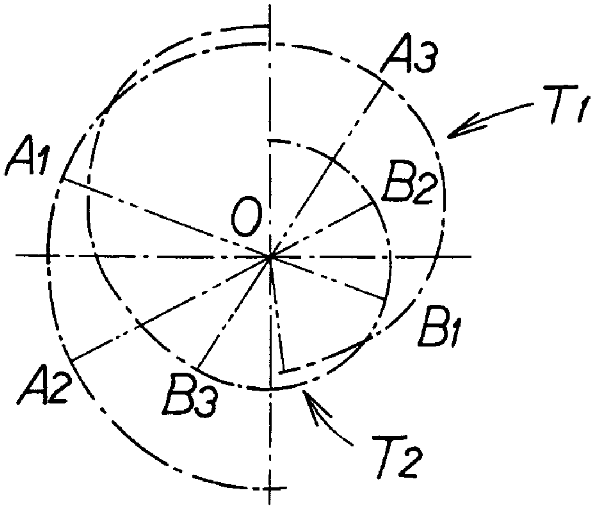
FIG. 7 is an explanatory drawing showing a relationship between a trail of a center of the first cam contacting member and a trail of a center of the second cam contacting member.

FIG. 7 shows a relationship between a trail T1 of the center of the first cam contacting member 8 and a trail T2 of the center of the second cam contacting member 9, where O is an axial center of the camshaft 5, if the assumption is made that the first and second cam contacting members 8 and 9 roll on the cam face 6*a* of the first cam 6 and the cam face 7*a* of the second cam 7. If the center of the first cam contacting member 8 rolling on the cam face 6*a* is at a point A1, the center B1 of the second cam contacting member 9 corresponding to the center A1 is at a distance L from the point A1 on a straight line connecting the point A1 and the axial center O of the camshaft 5. If the first cam contacting member 8 rolls on the cam face 6*a* and its center moves to a point A2 or A3, the center B2 or B3 of the second cam contacting member 9 corresponding to the point is at a distance L from the point A2,A3 on a straight line connecting the point A2,A3 and the axial center O of the camshaft 5. Therefore, if the shape of the cam face 6*a* is completed, the trail T2 of the center of the second cam contacting member 9 moving on the cam face 7*a* of the second cam 7 can be obtained and a shape of the cam face 7*a* of the second cam 7 having a conjugate relationship can be obtained easily based on the trail T2.

Incidentally, although the above description of the cam contacting members is roller-shaped, they are not limited to being roller-shape, and may be formed in a pin-shaped member contacting the cam face, for example.

Figure 8:
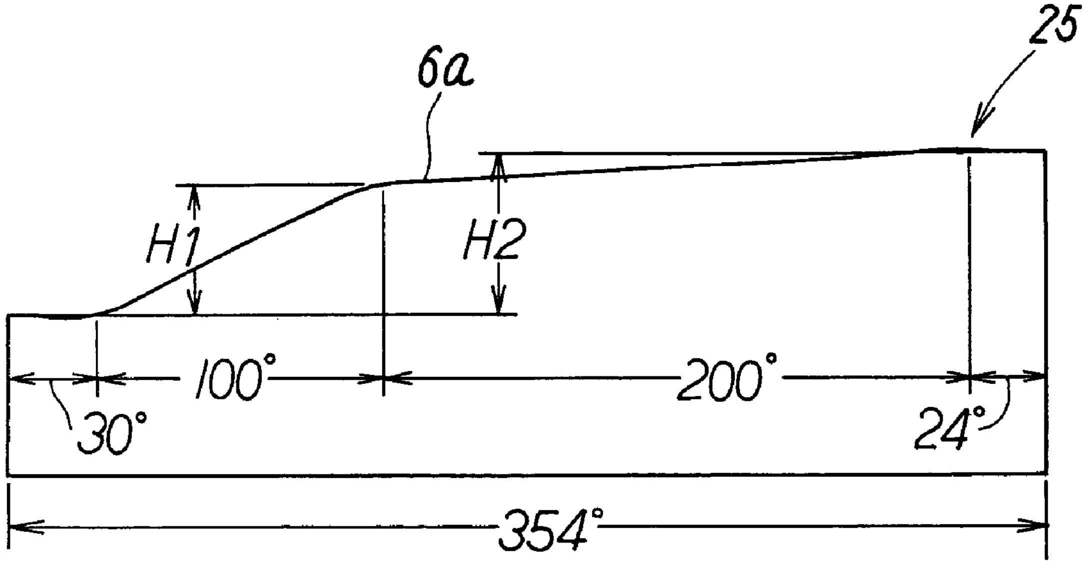
FIG. 8 is a diagram showing a developed state of a cam face of the first cam.

The shape of the cam face 6*a* of the first cam 6 is determined based on the nature of the clamping operation and a preferable example is shown in FIG. 8. FIG. 8 shows in a developed view the shape of the cam face 6*a* of the first cam 6 starting from a position where the cam contacting member 8 is in contact with the first cam 6 in FIG. 6(*a*). The cam face 6*a* of the first cam 6 has a steep inclination so as to move the driven rod 11 at a high speed until the clamping arm 12 reaches a vicinity of an end and has a gradual inclination so as to move the driven rod 12 at a low speed and to allow the rod 12 to exert a strong force after the clamping arm 12 has reached the vicinity of the end. A straight stroke of the cam contacting member 8 in a portion for moving the driven rod 11 at a high speed is shown by H1 and an overall straight stroke of the cam contacting member 8 is shown by H2. At a portion on the cam face 6*a* of the first cam 6 immediately before the clamping arm 12 reaches the end of the clamp stroke, a toggle forming projection 25 is formed so as to return the arm driving rod to a final clamping position after the rod has slightly overshot the final clamping position. FIG. 8 shows a concrete example of the cam face 6*a* of the first cam 6 with numerical values. In FIG. 8 the length of the stroke H1 is 16 mm and the length of the stroke H2 is 20 mm.

The body 2 is formed of body pieces 2*a* and 2*b* obtained by division into two so as to house the electric motor 3, the speed reducing mechanism 4, the first and second cams 6 and 7, and the like inside them, a body piece 2*c* fixed to upper end portions of the body pieces 2*a* and 2*b*, and a body piece 2*d* fixed to an upper end portion of the body piece 2*c*.

Between the body pieces 2*a* and 2*b* obtained by division into two, not only the camshaft 5 common to the first cam 6 and the second cam 7 can be supported by bushings 31*a* and 31*b* but also the shafts of the respective spur gears can be supported and the electric motor 3 can also be fixed. The body piece 2*c* is fixed by fitting a lower portion of the body piece 2*c* into upper portions of the body pieces 2*a* and 2*b* and the bushing 17 for guiding the flange portion 11*b* of the driven rod 11 for sliding is mounted on an inner face of the body piece 2*c*. To the body piece 2*d* connected to an upper end of the body piece 2*c*, the bushing 18 for guiding the spring case 13 for sliding is mounted. Moreover, between the body piece 2*c* and the body piece 2*d*, a bracket 33 is sandwiched.

Figure 9:
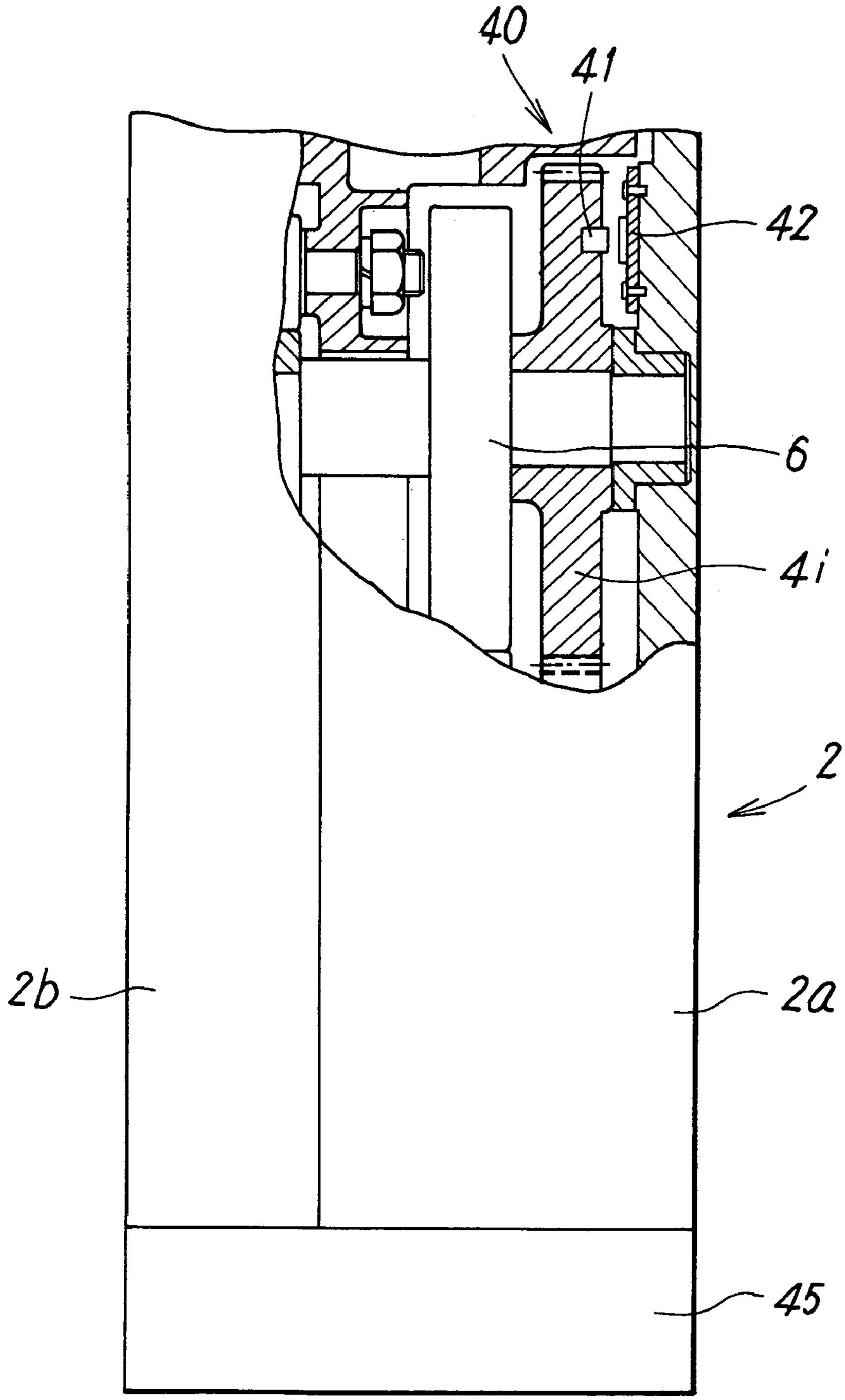
FIG. 9 is a partially-cutaway side view showing a structure of a sensor mechanism for detecting a working position of the clamping arm.
Figure 10:
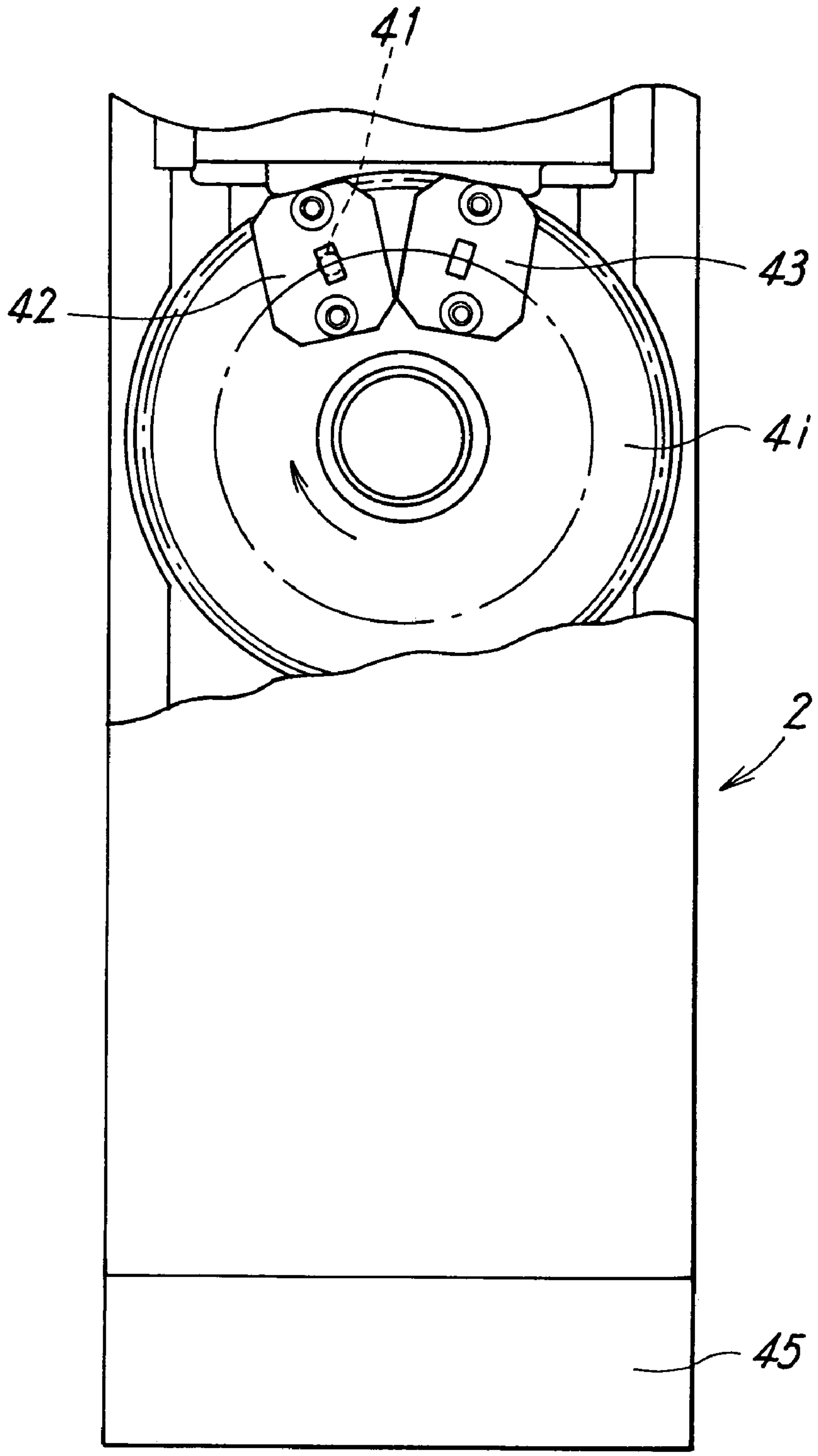
FIG. 10 is a partially-cutaway front view of the same.

FIGS. 9 and 10 specifically show a structure of a sensor mechanism 40 for detecting a moving position of the clamping arm 12. The sensor mechanism 40 is provided with a magnet 41 on a part of a side surface of the spur gear 4*i* on the last step of the speed reducing mechanism that reduces the speed of the rotation of the electric motor 3, and is further provided with sensors 42,43 for detecting the vicinity of the magnet 41 at position facing a part of the rotation trace of the magnet 41 in the inner surface of the body 2. The sensor 42 detects a magnetic field of the magnet 41 at a position facing the magnet 41 when the clamping arm 12 is in a completely clamped condition, and the sensor 43 detects a magnetic field of the magnet 41 at a position facing the magnet 41 when the clamping arm 12 is in a completely unclamped condition, thereby recognizing the moving condition of the electric pin clamping device. Outputs from the sensors 42,43 are transmitted to a controller 45 attached to the body 2 for controlling the movement of the electric pin clamping device, and together with signals from other sensor or command signals from outside, are utilized for the control or confirmation of movements.

In the electric pin clamping device 1 having the above structure, the first and second cams 6 and 7 conjugate with each other on the camshaft 5 are driven by the electric motor 3 through the speed reducing mechanism 4, the clamping arm 12 is driven by the first and second cam contacting members 8 and 9 respectively in contact with the cam faces 6*a* and 7*a* of the cams 6 and 7 through the arm driving rod 10, the first cam 6 applies the force in the clamping direction to the arm driving rod 10 through the first cam contacting member 8, and the second cam 7 applies the force in the returning direction to the arm driving rod 10 through the second cam contacting member 9. Therefore, by properly designing the cam faces 6*a* and 7*a* of the first and second cams 6 and 7, it is possible to provide the clamp stroke and the return stroke required for operation to the clamping arm 12 with a simple structure.

In the electric pin clamping device 1, because the clamping arm 12 is driven at a high speed until it reaches the vicinity of the end of the clamp stoke for clamping the workpiece, the operating time can be saved. Because the clamping arm 12 is driven at a low speed after it has reached the vicinity of the end of the clamp stroke, a sufficiently large clamping force required for operation can be applied to the clamping arm 12 even by using a small and low-power electric motor 3 as a power source.

Furthermore, in the electric pin clamping device, the force of the driven rod 11 in the clamping direction is transmitted to the clamping arm 12 through the spring case 13, the clamp spring 14, and the connecting rod 15. Therefore, size variations of the workpieces can be absorbed by the clamp spring 14 in clamping the workpieces to thereby reliably clamp the workpieces with substantially constant clamping force. Moreover, because the toggle forming projection 25 where the arm driving rod 10 slightly overshoots the final clamping position is formed at a portion on the cam face 6*a* of the first cam 6 immediately before reaching the end of the clamp stroke, when the clamping arm 12 is driven to the final clamping position, the clamping arm can be locked at the position.

Although the electric pin clamping device of the present invention has been described above in detail, the present invention is not limited to the electric pin clamping device of the above embodiment but various changes in design can be made without departing from a spirit of the invention described in the claims of the invention.

The invention claimed is:

1. An electric locking device comprising:

a body forming an outer shell of the device;

a camshaft coupled to an electric motor through a speed reducing mechanism in the body;

first and second cams fixed to the camshaft and conjugate with each other;

first and second cam contacting members respectively in contact with cam faces of the first and second cams to convert rotational motions of the first and second cams into linear motions in the same direction;

an arm driving rod including a supporting rod for supporting the first and second cam contacting members with a constant distance between them in their moving direction and driven in the moving direction by the first and second cam contacting members; and a clamping arm driven by the arm driving rod to carry out a clamping operation, wherein the first cam includes the cam face required for driving the arm driving rod in a clamping direction through the first cam contacting member, the second cam includes the cam face required for driving the arm driving rod in a returning direction through the second cam contacting member, the cam face of the first cam is such a cam face as to move the arm driving rod at a high speed until the clamping arm reaches a vicinity of an end and to move the rod at a lower speed after the arm has reached the vicinity of the end, and the cam faces of the first and second cams are conjugate with each other so that the first and second cam contacting members are always and substantially in contact with the cam faces.

2. The electric locking device according to claim 1, wherein the cam faces of the first and second cams are substantially spiral curved faces and directions of the spirals of both the cam faces are opposite to each other.

3. The electric locking device according to claim 1 or 2, wherein the speed reducing mechanism for reducing a speed of and driving the camshaft by the electric motor is formed by connecting gear speed reducing mechanisms in which large-diameter spur gears are driven by small-diameter spur gears in multiple stages.

4. The electric locking device according to claim 1 or 2, wherein the clamping arm having a hook-shaped clamp head at a tip end of the arm is coupled to a tip end of the arm driving rod for turning, a guide groove is formed in the clamping arm, a guide pin, said guide pin being fitted in the guide groove, and the clamping arm having the guide groove is disposed so that the arm can move while guided by the guide pin, and the guide groove in the clamping arm is formed in such a shape as to provide a desired clamping operation to the clamp head of the clamping arm.

5. The electric locking device according to claim 4, wherein the guide groove in the clamping arm is formed of an inclined groove for moving the clamp head from a retracted position where the clamp head is retracted to a clamping ready position where the head faces a workpiece to be clamped in an initial position for starting the clamping operation and a clamping direction groove contiguous to the inclined groove for guiding the head from the clamp ready position to a clamping position.

6. The electric locking device according to claim 5, wherein the arm driving rod is formed by disposing a clamp spring for applying a clamping force between a driven rod mounted with two cam contacting members and a connecting rod coupled to the clamping arm.

7. The electric locking device according to claim 6, wherein a spring case housing the clamp spring is coupled to the driven rod, an end of the clamp spring on a side of the clamping arm is retained by the spring case, the opposite end of the clamp spring is coupled to the connecting rod, and the clamping arm is rotatably coupled to the connecting rod.

8. The electric locking device according to claim 7, wherein a flange portion to which the spring case is fixed is provided to the driven rod and movements of the flange portion and the spring case are guided by bushings respectively fitted in the body.

9. The electric locking device according to claim 8, wherein the connecting rod includes a head portion to which the clamping arm is coupled for turning and a shaft portion having a smaller diameter than the head portion, the spring case includes a partition wall having a through hole through which the shaft portion of the connecting rod passes in a case cylinder housing the clamp spring, the head portion of the connecting rod is housed for sliding on a clamp arm side of the partition wall, and the shaft portion of the connecting rod is inserted through a center of the clamp spring housed in the case cylinder and a spring seat for receiving the end portion of the clamp spring is fixed to a tip end of the connecting rod on an opposite face side of the partition wall.

10. The electric locking device according to claim 1 or 2, wherein a toggle forming projection at which the arm driving rod slightly overshoots a final clamping position is provided at a portion on the cam face of the first cam immediately before the clamping arm reaches an end of a clamp stroke.

* * * * *